(12) United States Patent
Mori et al.

(10) Patent No.: US 11,579,821 B2
(45) Date of Patent: Feb. 14, 2023

(54) PRINTING APPARATUS

(71) Applicant: SEIKO EPSON CORPORATION, Tokyo (JP)

(72) Inventors: Takuto Mori, Nagano (JP); Katsuo Takeuchi, Nagano (JP); Toru Matsuyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/652,699

(22) Filed: Feb. 28, 2022

(65) Prior Publication Data

US 2022/0283755 A1 Sep. 8, 2022

(30) Foreign Application Priority Data

Mar. 2, 2021 (JP) .............................. JP2021-032344

(51) Int. Cl.
*G06F 3/12* (2006.01)
*G06F 1/3234* (2019.01)

(52) U.S. Cl.
CPC .......... *G06F 3/1221* (2013.01); *G06F 3/1279* (2013.01); *G06F 3/1292* (2013.01)

(58) Field of Classification Search
CPC ..... G06F 3/1221; G06F 3/1279; G06F 3/1292
USPC ......................................................... 358/1.1
See application file for complete search history.

(56) References Cited

U.S. PATENT DOCUMENTS

| 2005/0200703 A1* | 9/2005 | Kobayashi | ......... H04N 1/00408 |
| | | | 348/207.2 |
| 2014/0240736 A1* | 8/2014 | Tsongas | ................ G06F 3/1267 |
| | | | 358/1.13 |
| 2018/0285038 A1* | 10/2018 | Shimamura | ............. G06F 1/329 |

FOREIGN PATENT DOCUMENTS

| JP | 2019-047592 A | 3/2019 |
| JP | 2020-052959 A | 4/2020 |

* cited by examiner

*Primary Examiner* — Allen H Nguyen
(74) *Attorney, Agent, or Firm* — Global IP Counselors, LLP

(57) ABSTRACT

A printing apparatus includes: a printing section including a plurality of printing elements that performs printing on a medium; a power supply circuit supplying power to the printing section; a control circuit controlling the printing section and the power supply circuit; and a USB-Type-C interface configured to couple an external device and including a data transmission/reception terminal, a power input/output terminal, and a state identification terminal. When the state identification terminal detects that the external device that receives the power via the power input/output terminal is coupled, and the printing section performs printing, an amount of power supplied to the external device is large in a case in which a drive rate of the plurality of printing elements is low as compared with a case in which the drive rate of the plurality of printing elements is high.

7 Claims, 14 Drawing Sheets

FIG. 7

| DRIVE RATE [%] | MAXIMUM AMOUNT OF POWER THAT CAN BE SUPPLIED [W] | VOLTAGE [V] | CURRENT [A] |
| --- | --- | --- | --- |
| 0 TO 19 | 100 | 20 | 5 |
| 20 TO 29 | 60 | 20 | 3 |
| 30 TO 49 | 36 | 12 | 3 |
| 50 TO 69 | 18 | 12 | 1.5 |
| 70 TO 89 | 10 | 5 | 2 |
| 90 TO 100 | 0 | 0 | 0 |

FIG. 8

| MEDIUM TRANSPORT SPEED LEVEL | MAXIMUM AMOUNT OF POWER THAT CAN BE SUPPLIED [W] | VOLTAGE [V] | CURRENT [A] |
|---|---|---|---|
| LEVEL 0 | 100 | 20 | 5 |
| LEVEL 1 (LOW-SPEED PRINTING) | 60 | 20 | 3 |
| LEVEL 2 | 36 | 12 | 3 |
| LEVEL 3 | 18 | 12 | 1.5 |
| LEVEL 4 | 10 | 5 | 2 |
| LEVEL 5 (HIGH-SPEED PRINTING) | 0 | 0 | 0 |

FIG. 9

| PRINTING RESOLUTION RANK | MAXIMUM AMOUNT OF POWER THAT CAN BE SUPPLIED [W] | VOLTAGE [V] | CURRENT [A] |
|---|---|---|---|
| RANK 0 | 100 | 20 | 5 |
| RANK 1 | 60 | 20 | 3 |
| RANK 2 | 36 | 12 | 3 |
| RANK 3 | 18 | 12 | 1.5 |
| RANK 4 | 10 | 5 | 2 |
| RANK 5 | 0 | 0 | 0 |

FIG. 10

| MEDIUM TRANSPORT SPEED LEVEL | PRINTING RESOLUTION RANK | MAXIMUM AMOUNT OF POWER THAT CAN BE SUPPLIED [W] | VOLTAGE [V] | CURRENT [A] |
|---|---|---|---|---|
| LEVEL 0 | RANK 0 | 100 | 20 | 5 |
| LEVEL 1 (LOW-SPEED PRINTING) | RANK 1 | 60 | 20 | 3 |
| | RANK 2 | 36 | 12 | 3 |
| | RANK 3 | 18 | 12 | 1.5 |
| | RANK 4 | 10 | 5 | 2 |
| | RANK 5 | 0 | 0 | 0 |
| LEVEL 2 | RANK 1 | 36 | 12 | 3 |
| | RANK 2 | 36 | 12 | 3 |
| | RANK 3 | 18 | 12 | 1.5 |
| | RANK 4 | 10 | 5 | 2 |
| | RANK 5 | 0 | 0 | 0 |
| LEVEL 3 | RANK 1 | 18 | 12 | 1.5 |
| | RANK 2 | 18 | 12 | 1.5 |
| | RANK 3 | 18 | 12 | 1.5 |
| | RANK 4 | 10 | 5 | 2 |
| | RANK 5 | 0 | 0 | 0 |
| LEVEL 4 | RANK 1 | 10 | 5 | 2 |
| | RANK 2 | 10 | 5 | 2 |
| | RANK 3 | 10 | 5 | 2 |
| | RANK 4 | 10 | 5 | 2 |
| | RANK 5 | 0 | 0 | 0 |
| LEVEL 5 (HIGH-SPEED PRINTING) | RANK 1 | 0 | 0 | 0 |
| | RANK 2 | 0 | 0 | 0 |
| | RANK 3 | 0 | 0 | 0 |
| | RANK 4 | 0 | 0 | 0 |
| | RANK 5 | 0 | 0 | 0 |

PRINTING APPARATUS

The present application is based on, and claims priority from JP Application Serial Number 2021-032344, filed Mar. 2, 2021, the disclosure of which is hereby incorporated by reference herein in its entirety.

BACKGROUND

1. Technical Field

The present disclosure relates to a printing apparatus.

2. Related Art

A printing apparatus that supplies power to an external device coupled via a universal serial bus (USB) interface is provided (for example, see JP-A-2019-47592). The printing apparatus detects coupling of the external device in a first power supply mode in which no power is supplied to an image forming section, and then shifts from the first power supply mode to a second power supply mode, and starts to supply the power to the external device.

In the related art disclosed in JP-A-2019-47592, the power supply to the image forming section is started in accordance with the shift to the second power supply mode. However, when printing is executed in the printing apparatus while supplying the power to the external device in the related art, the power available in the printing apparatus may be insufficient and a desired printing operation may not be executed.

SUMMARY

A printing apparatus according to the present disclosure includes: a printing section including a plurality of printing elements that performs printing on a medium; a power supply circuit supplying power to the printing section; a control circuit controlling the printing section and the power supply circuit; and a USB-Type-C interface configured to couple an external device and including a data transmission/reception terminal, a power input/output terminal, and a state identification terminal. The data transmission/reception terminal receives a data signal from the external device, and transmits the data signal to the external device. The power input/output terminal receives the power supplied from the external device, and supplies the power from the power supply circuit to the external device. The state identification terminal identifies a state in which the data transmission/reception terminal receives the data signal or a state in which the data transmission/reception terminal transmits the data signal, and identifies a state in which the power input/output terminal receives the power supplied from the external device or a state in which the power input/output terminal supplies the power to the external device. When the state identification terminal detects that the external device that receives the power via the power input/output terminal is coupled, and the printing section performs printing, an amount of power supplied to the external device is large in a case in which a drive rate of the plurality of printing elements is low as compared with a case in which the drive rate of the plurality of printing elements is high.

BRIEF DESCRIPTION OF THE DRAWINGS

FIG. 7 is a table showing a relationship between a drive rate [%] of a heat generating element and a maximum amount of power [W] supplied to an external device.

FIG. 8 is a table showing a relationship between a medium transport speed level and the maximum amount of power [W] supplied to the external device.

FIG. 9 is a table showing a relationship between a printing resolution rank and the maximum amount of power [W] supplied to the external device.

FIG. 10 is a table showing a relationship between a medium transport speed, a printing resolution, and the maximum amount of power [W] supplied to the external device.

DESCRIPTION OF EXEMPLARY EMBODIMENTS

Hereinafter, embodiments for carrying out the present disclosure will be described with reference to the drawings. However, a dimension and a scale of each part are different from actual ones as appropriate in each drawing. The embodiments described below are preferred specific examples of the present disclosure and are thus added with technically preferred various limitations, but the scope of the present disclosure is not limited to such embodiments unless description for limiting the present disclosure is made in the following description.

Figure 1:
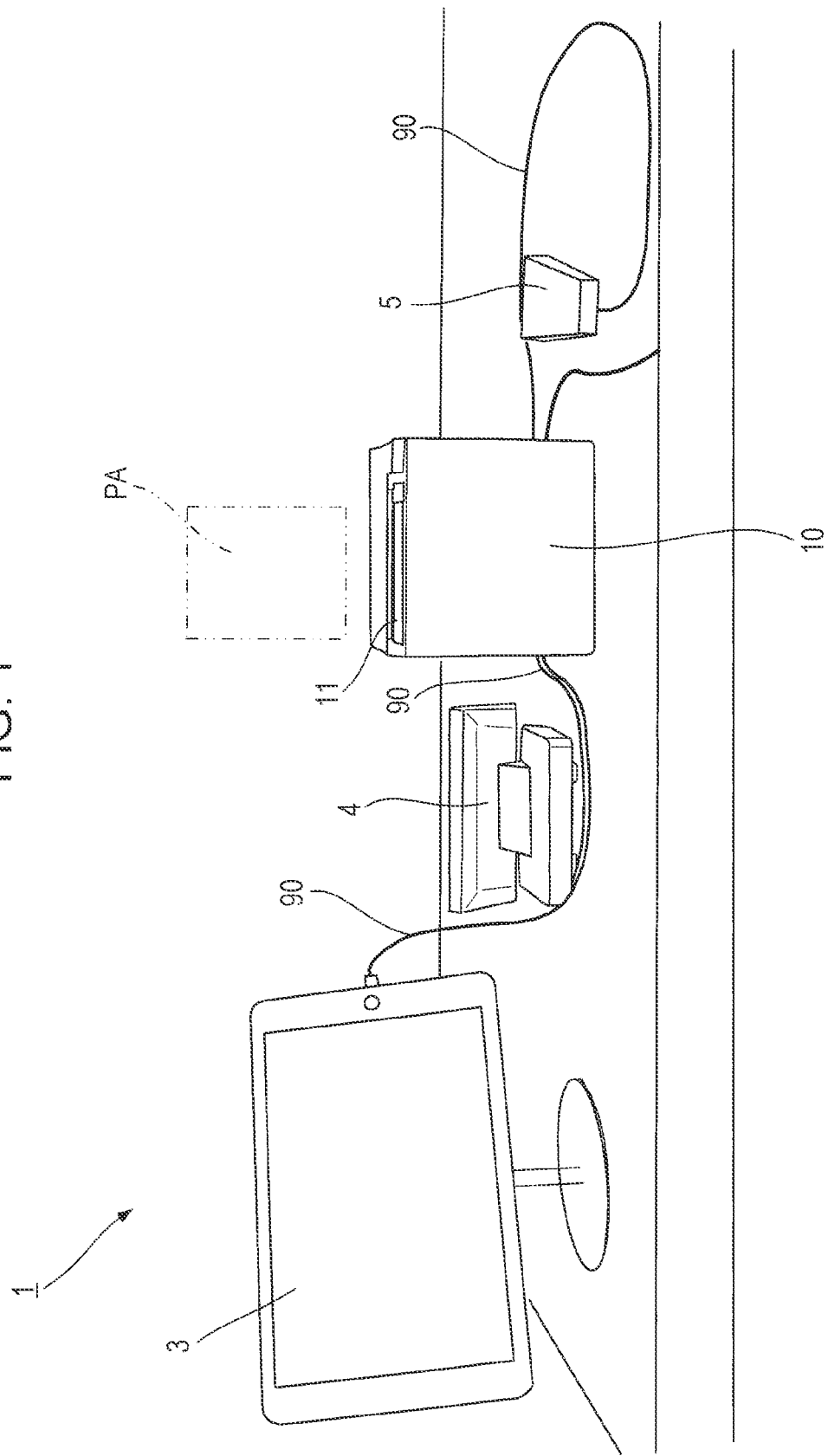
FIG. 1 is a schematic view illustrating a POS system according to a first embodiment.
Figure 2:
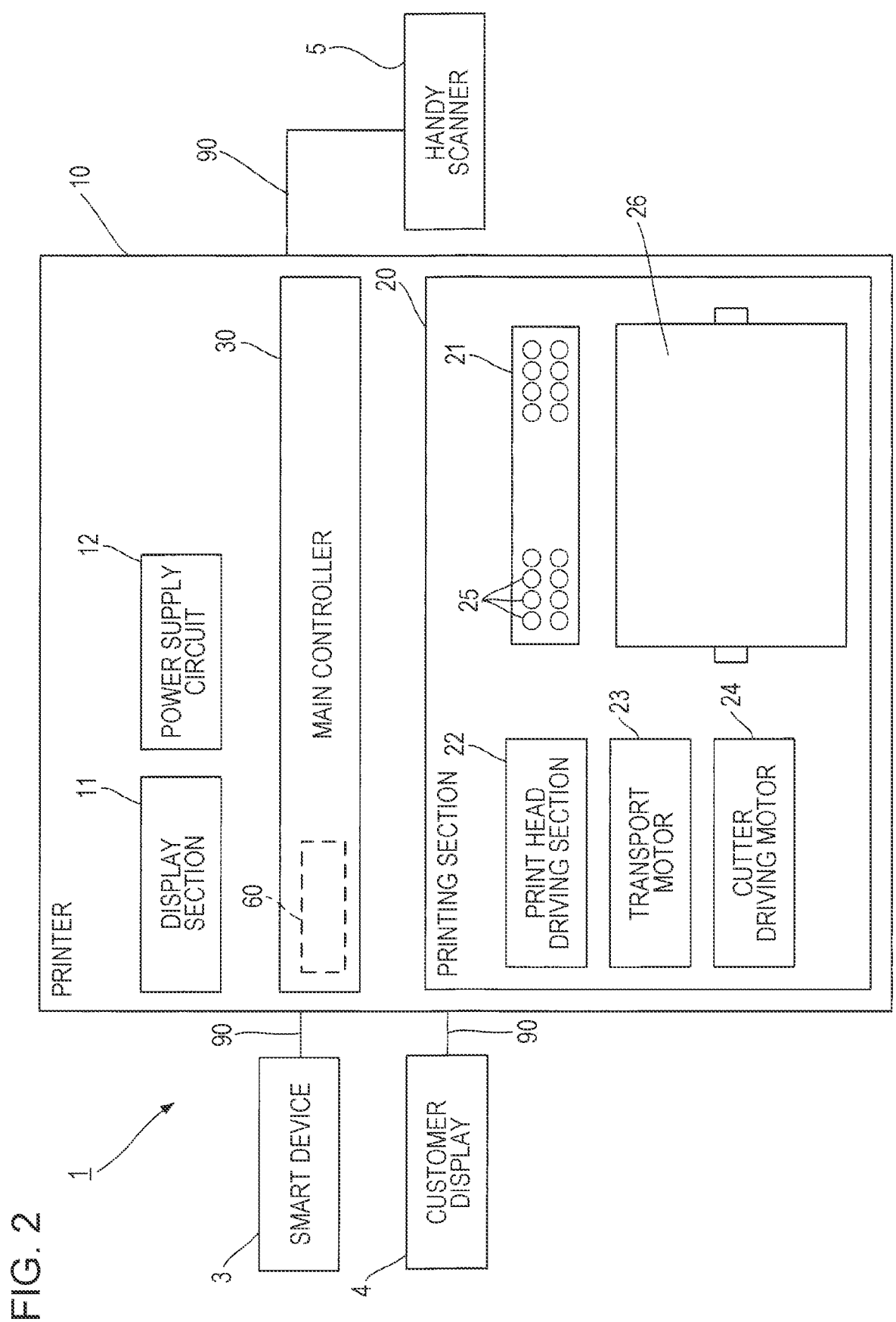
FIG. 2 is a block diagram illustrating the POS system.

FIG. 1 is a schematic view illustrating a POS system 1 according to a first embodiment. FIG. 2 is a block diagram illustrating the POS system 1. The POS system 1 illustrated in FIGS. 1 and 2 is used in a store, for example, and has a function of accounting for goods or services purchased by a customer and a function of issuing a receipt according to the accounting.

The POS system 1 includes a printer 10, a smart device 3, a customer display 4, and a handy scanner 5.

The smart device 3 is an example of an external device. The smart device 3 is a terminal that can be carried by a user. The smart device 3 is, for example, a tablet terminal or a smartphone. The smart device 3 includes a communication section (not illustrated) that communicates data according to a predetermined communication standard. The smart device 3 communicates with the printer 10 via the communication section. The smart device 3 can be coupled to the printer 10 via a USB interface, as will be described later. The smart device 3 can communicate with the printer 10 using wireless communication.

The smart device 3 includes a battery, and can be operated with power charged in the battery. The smart device 3 can charge the battery with power supplied from the printer 10 as will be described later. The smart device 3 is installed with an application for creating print data. The smart device 3 is installed with an application for POS.

The smart device 3 transmits a control-related command and a printing-related command to the printer 10 using a user's instruction or the like as a trigger. When these commands are received, the printer 10 stores the commands in a reception buffer to be described later. The control-related command includes, for example, a setting command for instructing format setting and a status request command for instructing a request for information indicating a state of the printer 10. The printing-related command includes, for example, a print command for instructing printing, a line feed command for instructing a line feed, a new line command for instructing a new line, a cutter command for instructing cutting of a medium, and the like. The printing-related command includes a command corresponding to a drive instruction for any one of a thermal head 21, a transport motor 23, and a cutter driving motor 24, which will be described later.

The smart device 3 uses the user's instruction or the like as a trigger to generate print data such as characters and images printed by the printer 10. The smart device 3 transmits a print command including the generated print data to the printer 10 according to a predetermined communication standard. The printer 10 executes a print command and prints characters, images, and the like on a medium based on the print data.

The customer display 4 is an example of an external device. The customer display 4 can be used, for example, by being placed on a counter table in the store. A customer who purchases goods at the store can visually recognize a price displayed on the customer display 4 and recognize a payment amount.

The customer display 4 is electrically coupled to the printer 10. The customer display 4 operates with the power supplied from the printer 10. The customer display 4 displays the price based on information output from the printer 10.

The handy scanner 5 is an example of an external device. The handy scanner 5 is electrically coupled to the printer 10. The handy scanner 5 operates with the power supplied from the printer 10. The printer 10 inputs information on an image scanned by the handy scanner 5. For example, a clerk who is a user scans a barcode attached to the goods using the handy scanner 5. Information on the scanned image is output to the smart device 3 via the printer 10. The smart device 3 can acquire information on the goods and information on the price.

The printer 10 is, for example, a thermal printer. The printer 10 includes a display section 11, a power supply circuit 12, a printing section 20, and a main controller 30.

The display section 11 is, for example, a liquid crystal display device. As illustrated in FIG. 2, the display section 11 is electrically coupled to the main controller 30 and is controlled by the main controller 30. The display section 11 displays, for example, information on a state of the printer 10. The display section 11 may display, for example, information on the communication state, information for prompting replenishment of thermal roll paper, and the like.

The power supply circuit 12 can supply power to the display section 11, the printing section 20, and the main controller 30. The power supply circuit 12 can be coupled to, for example, a commercial AC power supply, convert the power supplied from the commercial AC power supply into appropriate power, and supply the power to each section. The power supply circuit 12 includes, for example, a DC-DC converter, a resistance element, a switching element, a transistor, and the like. The power supply circuit 12 can supply the power to an external device electrically coupled to the printer 10, as will be described later. Examples of the external device include the smart device 3, the customer display 4, the handy scanner 5, and the like.

The printing section 20 includes the thermal head 21, a print head driving section 22, the transport motor 23, and the cutter driving motor 24. The printing section 20 has a transport roller (not illustrated) and a cutter. The cutter includes a fixed blade and a movable blade. The thermal head 21, the print head driving section 22, and the transport motor 23 are electrically coupled to the power supply circuit 12, and operate with the power supplied from the power supply circuit 12. The printing section 20 is controlled by the main controller 30. The printing section 20 executes printing based on the print data output from the smart device 3.

The thermal head 21 has many heat generating elements 25. The many heat generating elements 25 are arranged in a direction orthogonal to a transport direction of thermal roll paper 26 which is a medium PA. The heat generating element 25 is energized to apply heat to the printed surface of the thermal roll paper 26. As a result, the thermal head 21 can print characters, images, and the like on the thermal roll paper.

The print head driving section 22 is controlled by the main controller 30 to control the energization of the thermal head 21 to the heat generating element 25. The transport motor 23 is controlled by the main controller 30 to rotate the transport roller and transfer the thermal roll paper 26. The cutter driving motor 24 is controlled by the main controller 30 and drives the movable blade so as to slide toward the fixed blade and cut the thermal roll paper.

Figure 3:
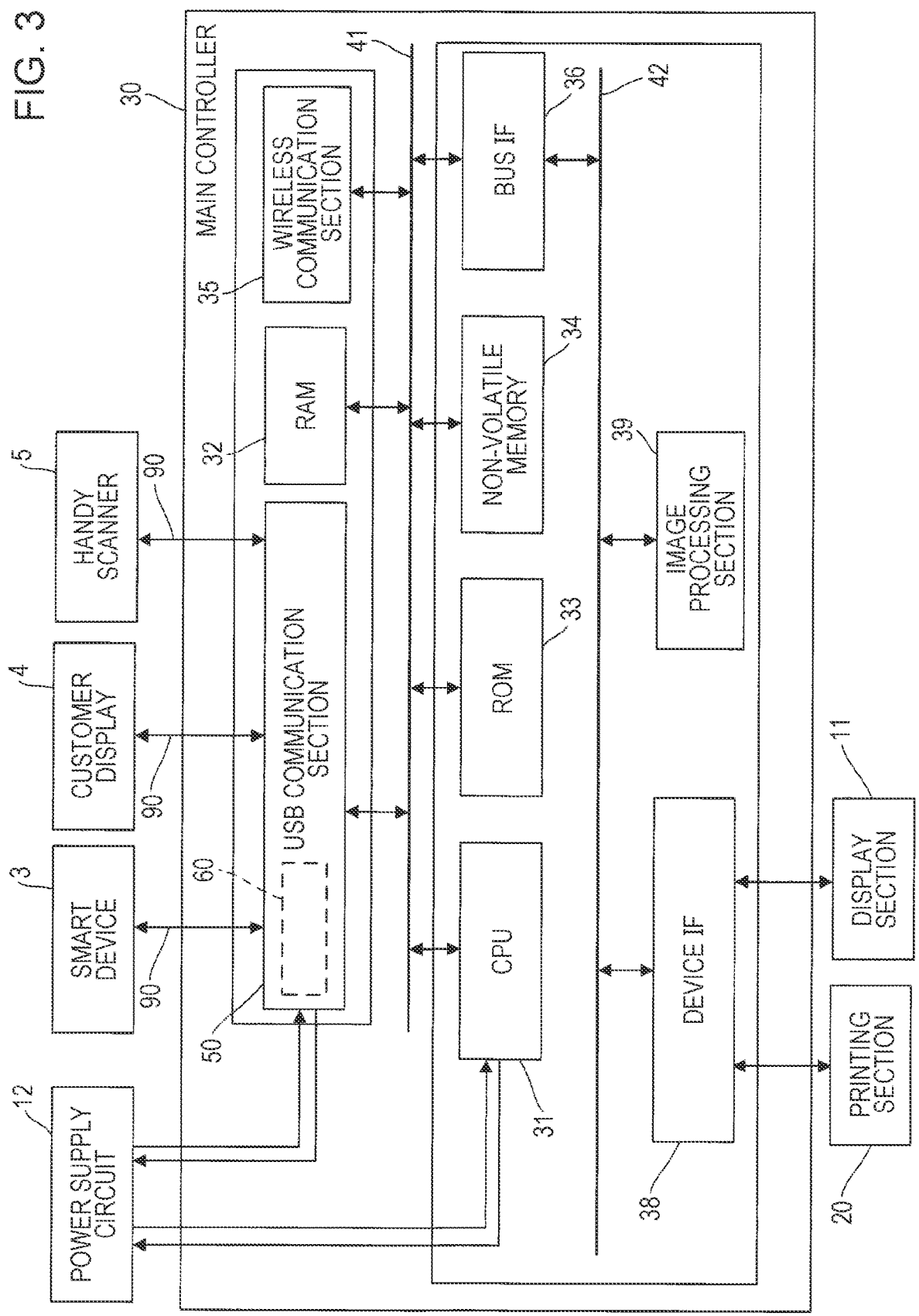
FIG. 3 is a block diagram illustrating a main controller of a printer.

FIG. 3 is a block diagram illustrating the main controller 30 of the printer 10. As illustrated in FIG. 3, the main controller 30 includes a CPU 31, a RAM 32, a ROM 33, a non-volatile memory 34, a wireless communication section 35, a USB communication section 50, and a BUS IF 36. The main controller 30 includes a device IF 38 and an image processing section 39. The CPU 31 is an example of a control circuit. Although the CPU is illustrated as an example of the control circuit, the control circuit may include hardware such as FPGA in place of or in addition to the CPU. The FPGA is an abbreviation for field programmable gate array.

The CPU 31 controls the main control of the printer 10. The CPU 31 is electrically coupled to the RAM 32, the ROM 33, the non-volatile memory 34, the wireless communication section 35, the USB communication section 50, and the BUS IF 36 via a system bus 41.

The RAM 32 is a memory that enables reading and writing at any time to provide a work area of the CPU 31. The RAM 32 can also be used as an image memory for temporarily storing image data. The ROM 33 is a boot ROM and stores a system boot program. The non-volatile memory 34 stores system software, set value data, and the like that need to be retained even after the power of the printer 10 is cut off.

The wireless communication section 35 can be coupled to an external device by using wireless communication. The wireless communication section 35 can communicate with an external device according to standards such as Wi-Fi (registered trademark) and Bluetooth (registered trademark). The BUS IF 36 is an interface that is electrically coupled to the system bus 41 and an image bus 42. The BUS IF 36 can operate as a bus bridge that transforms a data structure.

In addition to the BUS IF 36, the device IF 38 and the image processing section 39 are electrically coupled to the image bus 42. The device IF 38 is an interface for coupling the main controller 30, the printing section 20, and the display section 11. The device IF 38 can perform data synchronous/asynchronous conversion. The image processing section 39 can perform predetermined processing on data related to printing output to the printing section 20.

Figure 4:
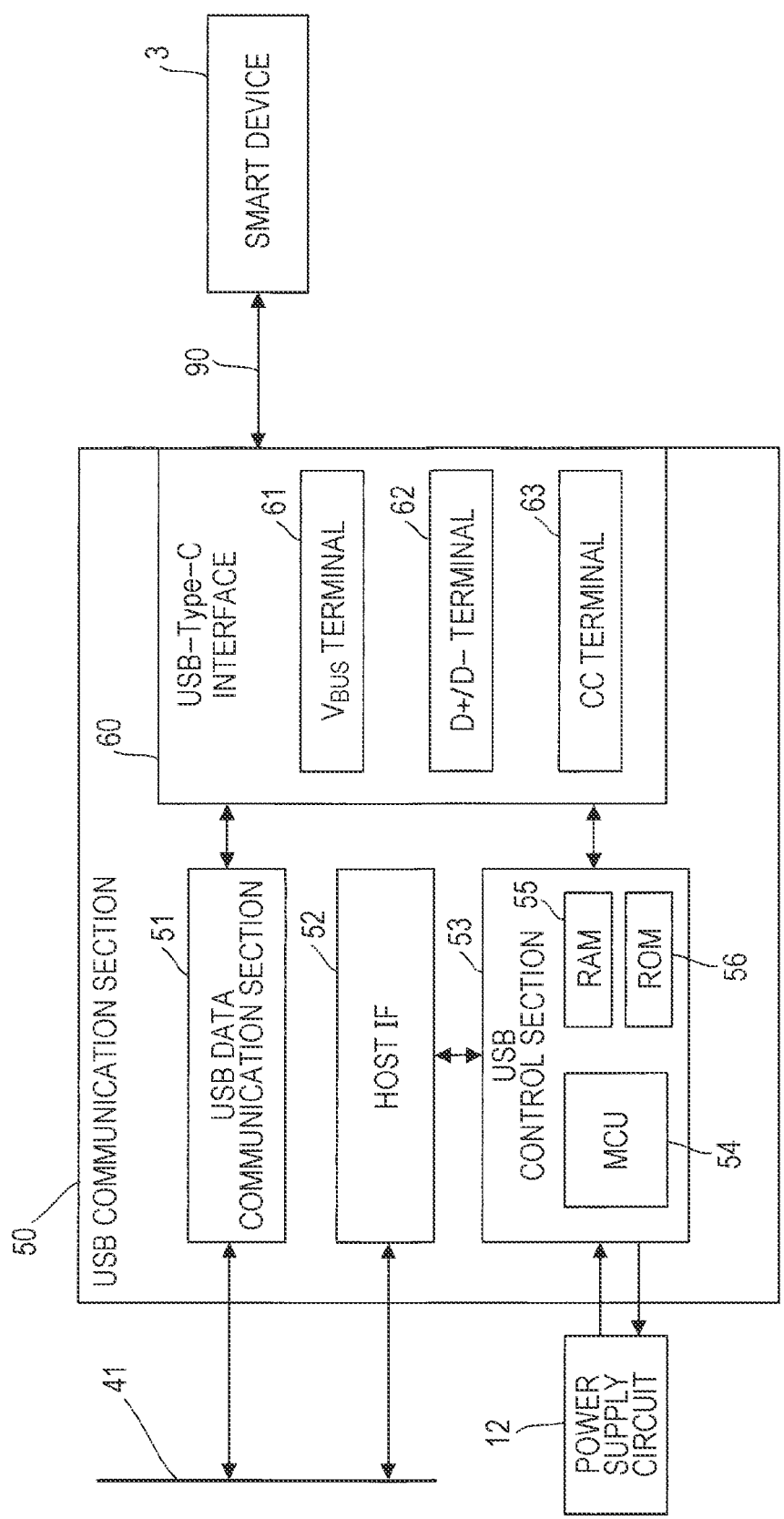
FIG. 4 is a block diagram illustrating a USB communication section.

FIG. 4 is a block diagram illustrating the USB communication section 50. As illustrated in FIG. 4, the USB communication section 50 includes a USB-Type-C interface 60, a USB data communication section 51, a host IF 52, and a USB control section 53.

The USB data communication section 51 performs data transmission/reception control and communication protocol control. The USB data communication section 51 can control data reception from an external device such as the smart device 3 coupled to a USB. The USB data communication section 51 can perform data transmission control for transmitting data such as the printing-related command to the system bus 41.

The host IF 52 is a communication interface with the CPU 31. The host IF 52 mediates mutual communication between the CPU 31 and the USB control section 53, for example, in synchronous serial communication or the like. The synchronous serial communication may be, for example, inter-integrated circuit (I2C) communication.

The USB control section 53 can execute processing in the USB communication section 50 based on a control instruction received via the host IF 52. The USB control section 53 may include a micro control unit (MCU) 54, the RAM 55, and the ROM 56.

The RAM 55 can retain power profile setting information indicating an amount of power that can be supplied by the printer 10. The MCU 54 can perform step-up processing or step-down processing on the power supplied from the power supply circuit 12 based on the power profile setting information using a regulator (not illustrated). As a result, the printer 10 can supply a desired amount of power to the external device via a $V_{BUS}$ terminal 61 to be described later.

The USB control section 53 can detect the printing-related command transmitted from the external device during sleeping of the printer 10. The USB control section 53 can notify the CPU 31 of the detection of the printing-related command and change the state of the printer 10.

The printer 10 may include a plurality of USB-Type-C interfaces 60. A USB-Type-C cable 90 is coupled to the USB-Type-C interface 60. The smart device 3, which is the external device, is coupled to the USB-Type-C interface 60 via the USB-Type-C cable 90.

The USB-Type-C interface 60 includes a $V_{BUS}$ terminal 61, a D+/D− terminal 62, and a configuration channel (CC) terminal 63. The $V_{BUS}$ terminal 61 is an example of a power input/output terminal. The $V_{BUS}$ terminal 61 can receive power from the external device. The $V_{BUS}$ terminal 61 can transmit a data signal to the external device. The D+/D− terminal 62 is an example of a data transmission/reception terminal. The D+/D− terminal 62 can receive the data signal from the external device. The data transmission/reception terminal can transmit the data signal to the external device.

The CC terminal 63 is an example of a state identification terminal. The CC terminal 63 can identify a state of whether the D+/D− terminal 62 can receive the data signal from the external device or whether the D+/D− terminal 62 can transmit the data signal to the external device. The CC terminal 63 can identify a state of whether the $V_{BUS}$ terminal 61 can receive the power from the external device or the $V_{BUS}$ terminal 61 can supply the power to the external device.

Figure 5:
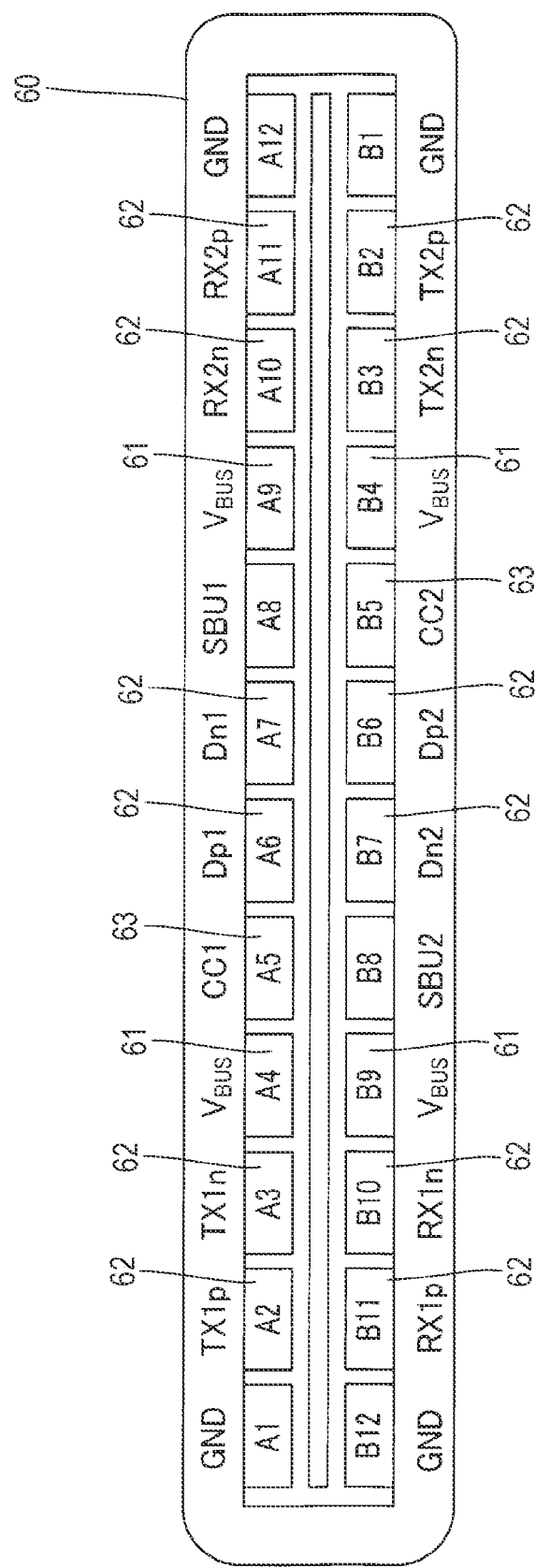
FIG. 5 is a schematic view illustrating an arrangement of terminals of a USB-Type-C interface.

FIG. 5 is a schematic view illustrating an arrangement of terminals of the USB-Type-C interface 60. The USB-Type-C interface 60 illustrated in FIG. 5 includes terminals A1 to A12 in a first row and terminals B1 to B12 in a second row. The terminals A1 to A12 and terminals B1 to B12 conform to the USB-Type-C standard.

The terminals A2, A3, A10, and A11 and the terminals B2, B3, B10, and B11 are included in the D+/D− terminal 62, and terminals supporting high-speed data communication. The high-speed data communication may be, for example, high-speed data communication by USB 3.1. The terminals A6 and A7 and the terminals B6 and B7 are included in the D+/D− terminal 62, and terminals supporting low-speed data communication. The low-speed data communication may be, for example, low-speed data communication by USB 2.0.

The terminals A4 and A9 and the terminals B4 and B9 are the $V_{BUS}$ terminals 61 and power supply terminals. The terminals A1 and A12 and the terminals B1 and B12 are GND terminals, and terminals transmitting a ground voltage. The terminal A8 and the terminal B8 are sideband use (SBU) terminals. The terminals A8 and B8 are terminals used for ALT mode support, and are coupled to a cable installed with Thunderbolt (registered trademark), DisplayPort, HDMI (registered trademark), and the like.

The terminal A5 and the terminal B5 are the CC terminals 63. Devices installed with the USB-Type-C interface 60 in compliance with the USB-Type-C standard can perform bidirectional communication. The USB-Type-C interface 60 can be switched to a downstream facing port (DFP) or an upstream facing port (UFP).

The USB-Type-C interface 60 can be switched between a first state and a second state. The USB-Type-C interface 60, which is in the first state, can operate as the UFP. The USB-Type-C interface 60, which is in the second state, can operate as the DFP. When the USB-Type-C interface 60 is in the first state, it can operate as a sink. When the USB-Type-C interface 60 is in the second state, it can operate as a source.

When the USB-Type-C interface 60 is in the first state, the printer 10 can cause the printing section 20 to perform a printing operation in response to a request from the smart device 3. The printing-related command output from the smart device 3 coupled via the USB-Type-C interface 60 is transmitted to the CPU 31. The CPU 31 can output a command signal to the printing section 20 to perform the printing operation.

Figure 6:
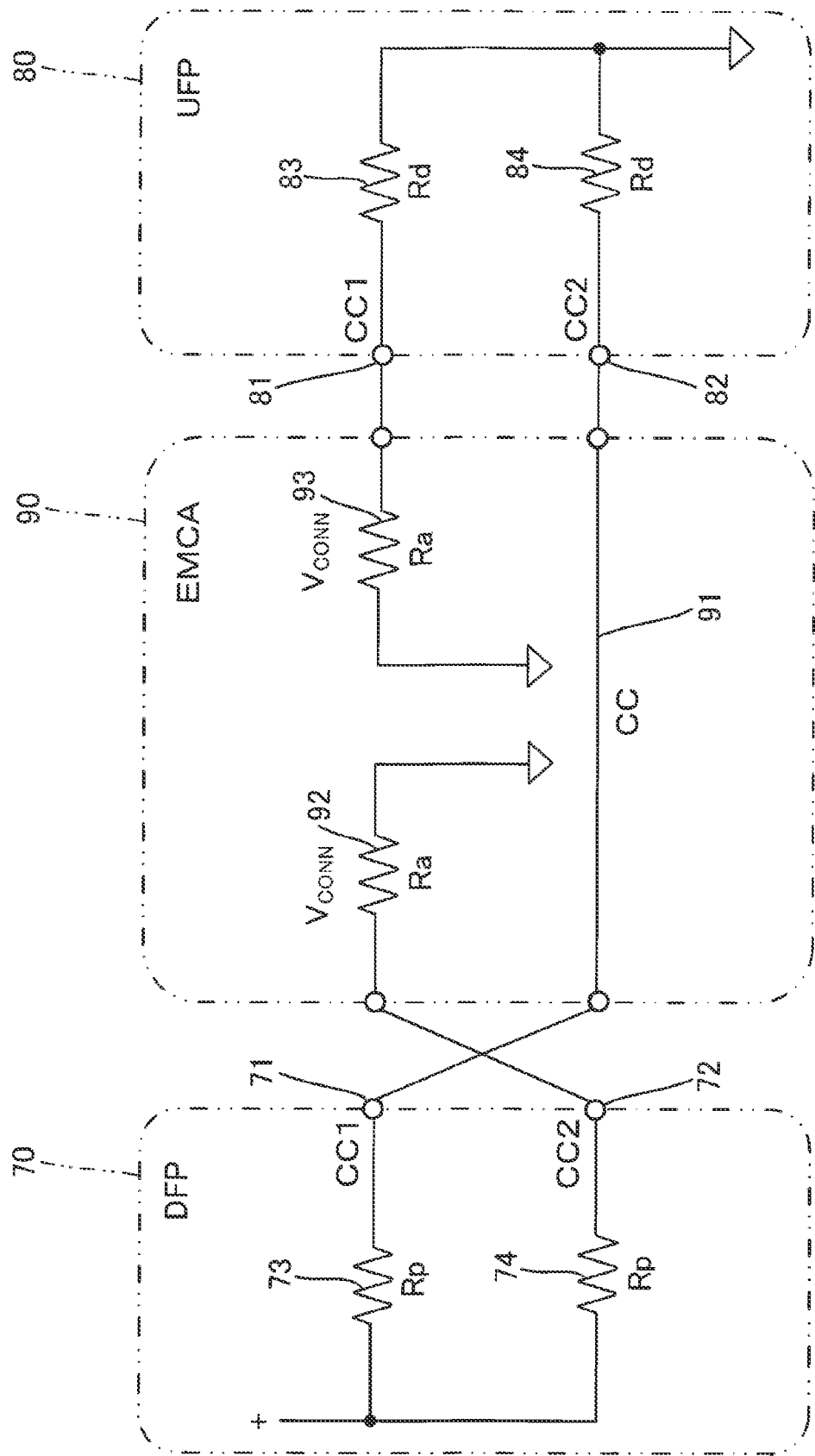
FIG. 6 is a circuit diagram illustrating electrical coupling between a DFP and a UFP.

FIG. 6 is a circuit diagram illustrating electrical coupling between a USB-Type-C interface operating as a DFP 70 and a USB-Type-C interface operating as a UFP 80. FIG. 6 illustrates only coupling of the CC terminal. When the USB-Type-C interface 60 of the printer 10 operates as the DFP 70, the USB-Type-C interface of the external device to be coupled operates as the UFP 80. When the USB-Type-C interface 60 of the printer 10 operates as the UFP 80, the USB-Type-C interface of the external device to be coupled operates as the DFP 70. The USB-Type-C interface operating as the DFP 70 is referred to as the DFP 70. The USB-Type-C interface operating as the UFP 80 is referred to the UFP 80.

The DFP 70 and UFP 80 are coupled to each other via a USB-Type-C cable 90. The DFP 70 has a CC1 terminal 71 and a CC2 terminal 72 as a CC terminal. A resistance element 73 is coupled to the CC1 terminal 71, and a resistance element 74 is coupled to the CC2 terminal 72. The resistance elements 73 and 74 are pull-up resistors Rp.

The UFP 80 has a CC1 terminal 81 and a CC2 terminal 82 as a CC terminal. A resistance element 83 is coupled to the CC1 terminal 81, and a resistance element 84 is coupled to the CC2 terminal 82. The resistance elements 83 and 84 are pull-down resistors Rd. When the printer 10 is the DFP 70, the CC1 terminal 71 and the CC2 terminal 72 are included in the CC terminal 63. When the printer 10 is the UFP 80, the CC1 terminal 81 and the CC2 terminal 82 are included in the CC terminal 63.

The USB-Type-C cable 90 includes a CC line 91 coupled to the CC terminal. The USB-Type-C cable 90 has a resistance element 92 coupled to the CC terminal of the DFP 70 and a resistance element 93 coupled to the CC terminal of the UFP 80. The resistance elements 92 and 93 are resistors Ra.

In a state in which the DFP 70 and the UFP 80 are not coupled to each other, the CC1 terminal 71 and the CC2 terminal 72 of the DFP 70 are regarded as having, for example, a second potential E2 by the resistance element 73 and the resistance element 74, respectively. The second potential E2 is, for example, 5 V.

In a state in which the DFP 70 and the UFP 80 are not coupled to each other, the CC1 terminal 81 and the CC2 terminal 82 of the UFP 80 are regarded as having, for example, a first potential E1 by the resistance element 83 and the resistance element 84, respectively. The first potential E1 is, for example, 0 V.

When the DFP 70 and the UFP 80 are coupled via the USB-Type-C cable 90, the CC1 terminal 71 of the DFP 70 is coupled to the CC2 terminal 82 of the UFP 80 via the CC line 91. The CC1 terminal 71 of the DFP 70 is set to a constant voltage by resistance division between the resistance element 73 and the resistance element 84. For example, the CC1 terminal 71 is held at a third potential E3.

When the DFP 70 and the UFP 80 are coupled via the USB-Type-C cable 90, the CC2 terminal 72 of the DFP 70 is coupled to the resistance element 92 of the USB-Type-C cable 90. The CC2 terminal 72 is set to a constant voltage by resistance division between the resistance element 74 and the resistance element 92. At this time, the voltage can be defined by the specifications of USB-Type-C, for example, and defined according to a current value corresponding thereto.

When the DFP 70 and the UFP 80 are coupled via the USB-Type-C cable 90, the CC1 terminal 81 of the UFP 80 is coupled to the resistance element 93 of the USB-Type-C cable 90.

The DFP 70 can treat a signal transmitted through the CC line 91 coupling the pull-up resistor Rp and the pull-down resistor Rd as a CC signal. The DFP 70 can treat a line coupling the pull-up resistor Rp and the resistor Ra as $V_{CONN}$. At this time, the voltage supplied to the USB-Type-C cable 90 can be defined by, for example, the specification of the USB-Type-C.

The DFP 70 can detect the UFP 80 coupled via the USB-Type-C cable 90 due to the presence of the resistance element 84. The DFP 70 changes the $V_{BUS}$ terminal 61 to be turned on and supplies 5 V. The UFP 80 detects the presence of the resistance element 73 and the power supplied via the $V_{BUS}$ terminal, and establishes coupling of the DFP 70.

When the external device is not coupled to the USB-Type-C interface 60, the CC terminal 63 is periodically and alternately switched between the first potential E1 and the second potential E2. When the external device coupled to the USB-Type-C interface 60 is detected, the CC terminal 63 is held at the third potential E3. The third potential E3 is a potential different from the first potential E1 and the second potential E2. The third potential E3 may be an intermediate potential between the first potential E1 and the second potential E2.

The first potential E1 is a signal indicating that the USB-Type-C interface 60 is coupled in the first state. The second potential E2 is a signal indicating that the USB-Type-C interface 60 is coupled in the second state.

When the DFP 70 is coupled to the USB-Type-C interface 60 in a case in which the CC terminal 63 is at the first potential E1, the USB-Type-C interface 60 recognizes the external device and is coupled in the first state. In this case, the USB-Type-C interface 60 can operate as the UFP 80.

When the UFP 80 is coupled to the USB-Type-C interface 60 in a case in which the CC terminal 63 has is at first potential E1, the CC terminal 63 does not recognize the external device.

When the UFP 80 is coupled to the USB-Type-C interface 60 in a case in which the CC terminal 63 has is at second potential E2, the USB-Type-C interface 60 recognizes the external device and is coupled in the second state. In this case, the printer 10 can operate as the DFP 70.

When the DFP 70 is coupled to the USB-Type-C interface 60 in a case in which the CC terminal 63 is at the second potential E2, the CC terminal 63 does not recognize the external device.

When the USB-Type-C interface 60 is a sink, the power can be received from the external device coupled to the USB-Type-C interface 60 via the $V_{BUS}$ terminal 61. In this case, the USB-Type-C interface in the external device operates as a source.

When the USB-Type-C interface 60 is a source, the power can be supplied from the external device coupled to the USB-Type-C interface 60 via the $V_{BUS}$ terminal 61. In this case, the USB-Type-C interface 60 in the external device operates as a sink.

In general, the printer 10 has a longer time in a standby state in which the printing operation is not performed than in a state in which the printing operation is performed. For that reason, a time at which the CC terminal 63 is held at the second potential E2 is longer than the time at which the CC terminal 63 is held at the first potential E1, which is preferable.

When the USB-Type-C interface 60 is a sink, the data signal can be received from the external device coupled to the USB-Type-C interface 60 via the D+/D− terminal 62. In this case, the USB-Type-C interface 60 of the external device operates as a source.

When the USB-Type-C interface 60 is a source, the data signal can be transmitted from the external device coupled to the USB-Type-C interface 60 via the D+/D− terminal 62. In this case, the USB-Type-C interface 60 in the external device operates as a sink.

Power delivery in the USB-Type-C interface 60 is a standard defined by USB Power Delivery (USB PD). In the USB-Type-C interface 60, information related to a voltage, a direction, and a function to be supplied or received is transmitted between the printer 10 and the external device before starting the power delivery. In the power delivery, the power can be supplied or received based on a contract between devices connected to each other. A port that supplies the power is a source, and a port that receives the power is a sink. The device that functions as a source is a provider, and the device that functions as a sink is a consumer. The USB-Type-C interface 60 can change the amount of power supplied depending on a situation, and can change the supply or reception of the power.

Next, an example of power delivery processing in the USB-Type-C interface 60 will be described. The source checks an ID of the USB-Type-C cable 90 coupled to the USB-Type-C interface 60 and confirms whether or not a current of exceeding 3 A can flow.

The source notifies a power profile adaptable to the sink. The sink requests a desired profile at a number from the adaptable power profile notified by the source. The source notifies that the requested power profile is adaptable. Thereafter, the $V_{BUS}$ terminal 61 is turned on, and the source starts to supply the power to the sink.

Next, a relationship between a drive rate of a plurality of heat generating elements 25 and an amount of power supplied to the external device will be described. The ROM 33 of the main controller 30 stores data indicating the relationship between the drive rate of the heat generating elements 25 and the amount of power supplied to the external device. The CPU 31 can change the amount of power supplied to the external device coupled to the USB-Type-C interface 60 with reference to the data stored in the ROM 33. The drive rate of the plurality of heat generating elements 25 is a rate of the heat generating elements 25 used for the printing operation among all the heat generating elements 25.

FIG. 7 is a table showing a relationship between the drive rate [%] of the plurality of heat generating elements 25 and a maximum amount of power [W] supplied to the external device. The table in FIG. 7 shows the drive rate [%] of the heat generating elements 25, the maximum amount of power [W] that can be supplied to the external device, a voltage [V], and a current [A], in order from the left. When the drive rate of the heat generating elements 25 is 0 to 19%, the maximum amount of power that can be supplied is 100 W. In this case, power having a voltage of 20 V and a current of 5 A can be supplied to the external device.

When the drive rate of the heat generating element 25 is 20 to 29%, the maximum amount of power that can be supplied is 60 W. In this case, power having a voltage of 20 V and a current of 3 A can be supplied to the external device. When the drive rate of the heat generating elements 25 is 30 to 49%, the maximum amount of power that can be supplied is 36 W. In this case, power having a voltage of 12 V and a current of 3 A can be supplied to the external device. When the drive rate of the heat generating elements 25 is 50 to 69%, the maximum amount of power that can be supplied is 18 W. In this case, power having a voltage of 12 V and a current of 1.5 A can be supplied to the external device.

When the drive rate of the heat generating elements 25 is 70 to 89%, the maximum amount of power that can be supplied is 10 W. In this case, power having a voltage of 5 V and a current of 2 A can be supplied to the external device. When the drive rate of the heat generating elements 25 is 90 to 100%, no power is supplied to the external device. As a result, the printer 10 can change the power supplied to the external device according to the drive rate of the heat generating elements 25 when printing is performed. The printer 10 can execute a plurality of power supply modes having different maximum power that can be supplied to the external device in accordance with the drive rate of the heat generating elements 25. The printer 10 can gradually increase or decrease the maximum power that can be supplied to the external device in accordance with the drive rate of the heat generating elements 25.

Next, a relationship between a medium transport speed and the amount of power supplied to the external device. The ROM 33 of the main controller 30 stores data indicating the relationship between the medium transport speed level and the amount of power supplied to the external device. The medium transport speed may be a rotation speed of the transport motor of the printing section 20 or a transport speed of the medium PA.

FIG. 8 is a table showing a relationship between the medium transport speed level and the maximum amount of power [W] supplied to the external device. The table in FIG. 8 shows the medium transport speed level, the maximum amount of power [W] that can be supplied to the external device, a voltage [V], and a current [A], in order from the left. When the medium transport speed level is Level 0, the maximum amount of power that can be supplied is 100 W. In this case, power having a voltage of 20 V and a current of 5 A can be supplied to the external device. Level 0 includes, for example, a case where the medium is not transported. The medium transport speed increases in order of Level 1 to Level 5. Level 1 is low-speed printing that is the slowest. Level 5 is high-speed printing that is the fastest.

When the medium transport speed level is Level 1, the maximum amount of power that can be supplied is 60 W. In this case, power having a voltage of 20 V and a current of 3 A can be supplied to the external device. When the medium transport speed level is Level 2, the maximum amount of power that can be supplied is 36 W. In this case, power having a voltage of 12 V and a current of 3 A can be supplied to the external device. When the medium transport speed level is Level 3, the maximum amount of power that can be supplied is 18 W. In this case, power having a voltage of 12 V and a current of 1.5 A can be supplied to the external device.

When the medium transport speed level is Level 4, the maximum amount of power that can be supplied is 10 W. In this case, power having a voltage of 5 V and a current of 2 A can be supplied to the external device. When the medium transport speed level is Level 5, no power is supplied to the external device. As a result, the printer 10 can decrease the amount of power supplied to the external device in accordance with the increase in medium transport speed when printing is performed. The printer 10 can execute a plurality of power supply modes having different maximum power that can be supplied to the external device in accordance with the medium transport speed. The printer 10 can gradually increase or decrease the maximum power that can be supplied to the external device in accordance with the medium transport speed.

Next, a relationship between a printing resolution and the maximum amount of power [W] supplied to the external device will be described. The ROM 33 of the main controller 30 stores data indicating the relationship between the printing resolution and the amount of power supplied to the external device.

FIG. 9 is a table showing a relationship between a printing resolution rank and the maximum amount of power [W] supplied to the external device. The table in FIG. 9 shows the printing resolution rank, the maximum amount of power [W] that can be supplied to the external device, a voltage [V], and a current [A], in order from the left. The printing resolution rank includes Rank 0 to Rank 5. Rank 0 is a case where printing is not performed. The printing resolution is higher in order of Rank 1 to Rank 5. The printing resolution of Rank 1 is 300×300 [dpi]. The printing resolution of Rank 2 is 600×300 [dpi] or 300×600 [dpi]. The printing resolution of Rank 3 is 600×600 [dpi]. The printing resolution of Rank 4 is 1200×600 [dpi] or 600×1200 [dpi]. The printing resolution of Rank 5 is 1200×1200 [dpi].

When the printing resolution rank is Rank 0, the maximum amount of power that can be supplied is 100 W. In this case, power having a voltage of 20 V and a current of 5 A can be supplied to the external device. When the printing resolution rank is Rank 1, the maximum amount of power that can be supplied is 60 W. In this case, power having a voltage of 20 V and a current of 3 A can be supplied to the external device. When the printing resolution rank is Rank 2, the maximum amount of power that can be supplied is 36 W. In this case, power having a voltage of 12 V and a current of 3 A can be supplied to the external device.

When the printing resolution rank is Rank 3, the maximum amount of power that can be supplied is 18 W. In this case, power having a voltage of 12 V and a current of 1.5 A can be supplied to the external device. When the printing resolution rank is Rank 4, the maximum amount of power that can be supplied is 10 W. In this case, power having a voltage of 5 V and a current of 2 A can be supplied to the external device. When the printing resolution rank is Rank 5, no power is supplied to the external device. As a result, the printer 10 can decrease the amount of power supplied to the external device in accordance with the increase in printing resolution when printing is performed. The printer 10 can execute a plurality of power supply modes having different maximum power that can be supplied to the external device in accordance with the printing resolution. The printer 10 can gradually increase or decrease the maximum power that can be supplied to the external device in accordance with the printing resolution.

Next, a relationship between the medium transport speed, the printing resolution, and the maximum amount of power [W] supplied to the external device will be described. The ROM 33 of the main controller 30 stores data indicating the relationship between the medium transport speed, the printing resolution, and the amount of power supplied to the external device.

FIG. 10 is a table showing a relationship between the medium transport speed, the printing resolution, and the maximum amount of power [W] supplied to the external device. The table in FIG. 10 shows the medium transport speed level, the printing resolution rank, the maximum amount of power [W] that can be supplied to the external device, a voltage [V], and a current [A], in order from the left. When the medium transport speed level is Level 0, printing may not be performed, and the maximum amount of power that can be supplied is 100 W. In this case, power having a voltage of 20 V and a current of 5 A can be supplied to the external device.

As illustrated in FIG. 10, at the medium transport speed levels 1 to 5, the maximum amounts of power may be set for the printing resolution ranks 1 to 5, respectively. For example, when the medium transport speed level is Level 1 and the printing resolution rank is Rank 1, the maximum amount of power that can be supplied is 60 W. When the medium transport speed level is Level 1 and the printing resolution rank is Rank 2, the maximum amount of power that can be supplied is 36 W. When the medium transport speed level is Level 1 and the printing resolution rank is Rank 3, the maximum amount of power that can be supplied is 18 W. When the medium transport speed level is Level 1 and the printing resolution rank is Rank 4, the maximum amount of power that can be supplied is 10 W. When the medium transport speed level is Level 1 and the printing resolution rank is Rank 5, no power is supplied to the external device. As a result, the printer 10 can change the amount of power supplied to the external device in accordance with the medium transport speed level and the printing resolution rank when printing is performed. The printer 10 can execute a plurality of power supply modes having different maximum power that can be supplied to the external device in accordance with the medium transport speed and the printing resolution. The printer 10 can gradually increase or decrease the maximum power that can be supplied to the external device in accordance with the medium transport speed and the printing resolution.

Figure 11:
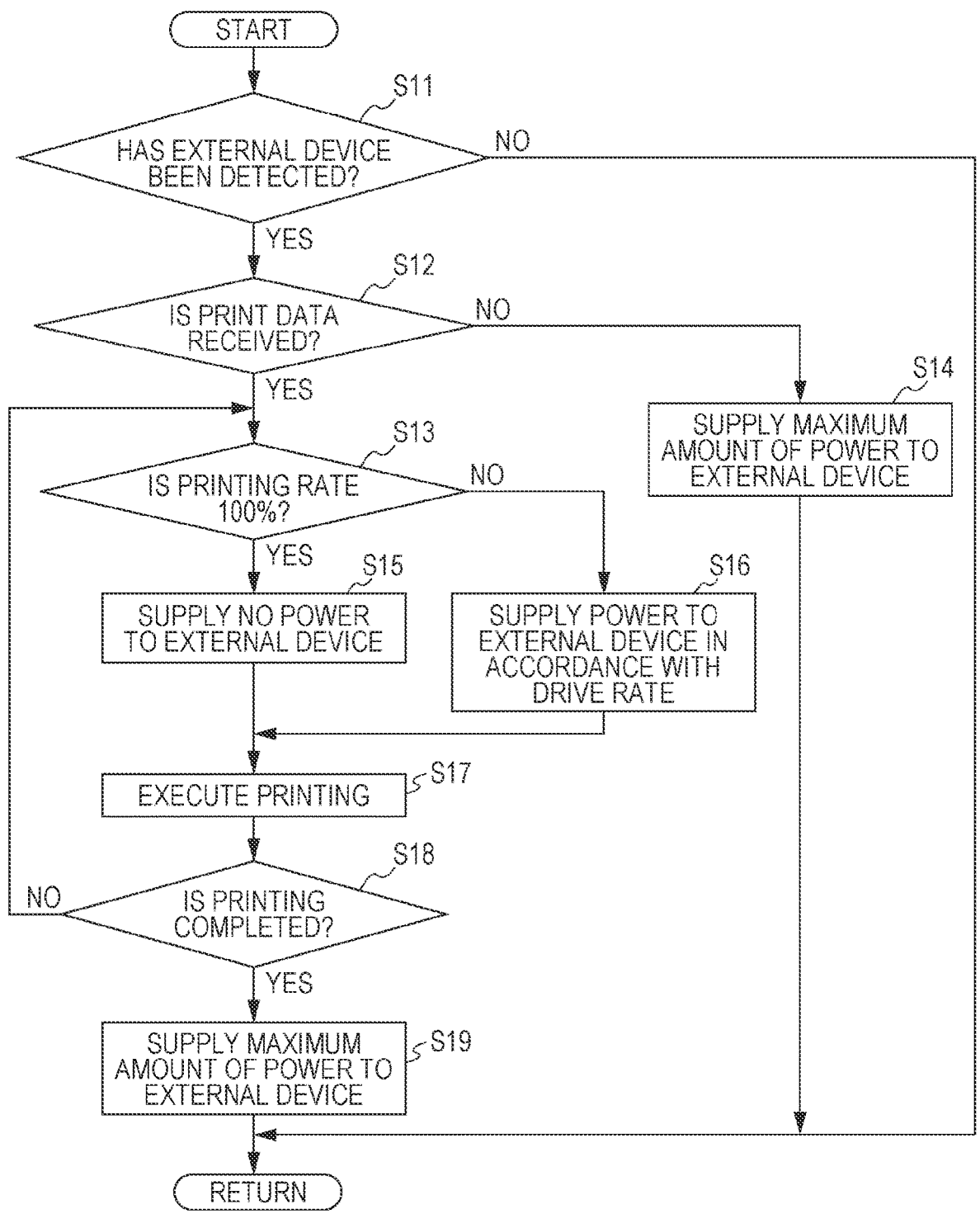
FIG. 11 is a flowchart illustrating another processing procedure in the printer.

Next, an example of processing in the printer 10 will be described with reference to FIG. 11. FIG. 11 is a flowchart illustrating still another processing procedure in the printer 10. First, in step S11, the CPU 31 determines whether or not the external device coupled to the USB-Type-C interface 60 has been detected. The CPU 31 can detect the external device coupled to the USB-Type-C interface 60 based on identification information received by the CC terminal 63.

When the CPU 31 has detected the external device, the CPU 31 proceeds to step S12. When the external device is not detected, the CPU 31 completes the process here. In step S12, the CPU 31 determines whether or not the print data is received. The CPU 31 determines whether or not the print data is received from the external device coupled to the USB-Type-C interface 60. When the print data is received, the CPU 31 proceeds to step S13. When the print data is not received, the CPU 31 proceeds to step S14.

In step S14, the printer 10 supplies the maximum power to the external device. The CPU 31 can control the power supply circuit 12 to supply the maximum power to the external device. The power supplied from the power supply circuit 12 is supplied to the external device via the $V_{BUS}$ terminal 61. For example, the maximum amount of power supplied from the printer 10 to the external device is 100 W.

In step S13, the CPU 31 analyzes the print data and determines whether or not to execute printing with a printing rate of 100%. When the printing with the printing rate of 100% is executed, the CPU 31 proceeds to step S15. When the printing with the printing rate of 100% is not executed, the CPU 31 proceeds to step S16.

In step S15, the CPU 31 determines not to supply the power to the external device. The printer 10 supplies no power to the external device when the printing rate is 100%. After step S15, the CPU 31 proceeds to step S17.

In step S16, the printer 10 supplies the power to the external device in accordance with the drive rate of the heat generating elements 25. The CPU 31 determines the amount of power supplied to the external device based on the data indicating the relationship between the drive rate of the heat generating elements 25 and the maximum amount of power supplied to the external device. The CPU 31 controls the power supply circuit 12 to supply the power to the external device. The CPU 31 can analyze the print data and recognize the drive rate of the heat generating elements 25. When the drive rate of the heat generating elements 25 is high, the CPU 31 sets the maximum amount of power supplied to the external device lower than a case where the drive rate of the heat generating element is low. After step S16, the CPU 31 proceeds to step S17.

In step S17, the CPU 31 causes the printing section 20 to execute printing based on the print data. Following step S18, the CPU 31 determines whether or not the printing has been completed. When the printing is completed, the CPU 31 proceeds to step S19. When the printing is not completed, the process returns to step S13, and the processes of step S13, and steps S15 to S18 are repeated until the printing is completed.

After the printing is completed, the CPU 31 proceeds to step S19. In step S19, similarly to step S14, the printer 10 supplies the maximum amount of power to the external device.

When the CC terminal 63 detects that the external device that can receive the power via the $V_{BUS}$ terminal 61 is coupled to the printer 10, and the printing section 20 performs printing, the amount of power supplied to the external device is large in a case in which the plurality of heat generating elements 25 have a low drive rate as compared with a case in which the plurality of heat generating elements 25 have a high drive rate. As a result, the printer 10 can change the amount of power supplied to the external device according to the drive rate of the heat generating elements 25. When the drive rate of the heat generating element is high, the amount of power supplied to the external device can be decreased to secure the amount of power that can be consumed by the printer 10.

The CPU 31 of the printer 10 can gradually decrease the amount of power supplied to the external device according to the increase in the drive rate of a plurality of printing elements. The CPU 31 refers to the data stored in the ROM 33 and gradually decreases the amount of power. As a result, the amount of power supplied to the external device can be decreased, and the amount of power that can be consumed by the printer 10 can be secured.

The CPU 31 switches the power supply mode to decrease the amount of power supplied to the external device before executing a print command in the printing section 20. The printer 10 supplies the power to the external device after switching the power supply mode according to the drive rate in step S16. Thereafter, the printing section 20 can start to perform printing in step S17.

After the printing section 20 completes the printing, the CPU 31 performs switching to the power supply mode in which the amount of power supplied to the external device is maximum. After completing the printing, in step S19, the printer 10 can be switched to the power supply mode in which the amount of power is maximum, and supply the power to the external device. As a result, the power supplied to the external device can be maximized in a state of the low power consumption in the printing section 20. Therefore, the maximum power can be supplied to the external device without hindering the power consumption in the printing section 20.

Figure 12:
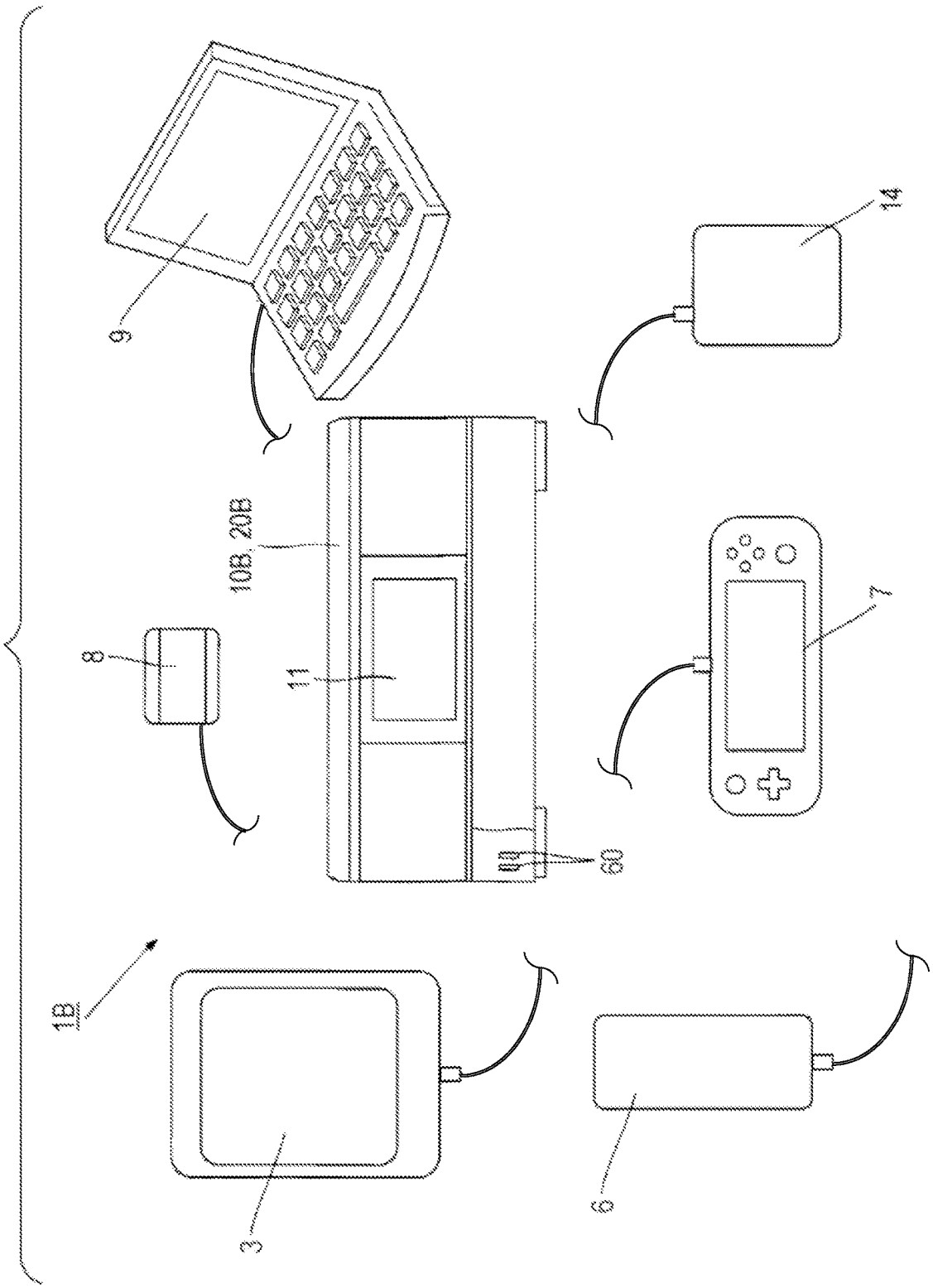
FIG. 12 is a schematic view illustrating a printer system according to a second embodiment.
Figure 13:
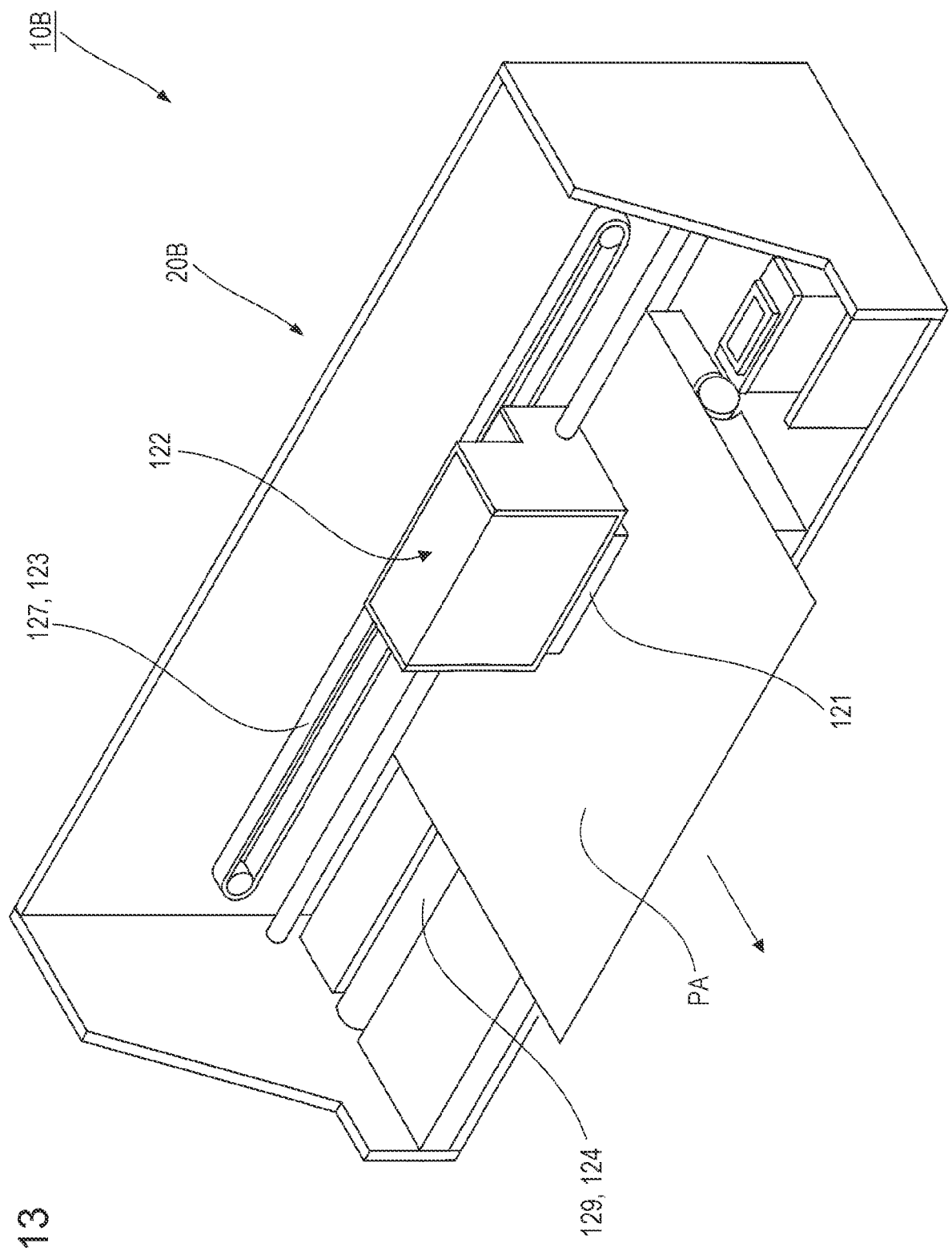
FIG. 13 is a perspective view illustrating a printing section of a printer.
Figure 14:
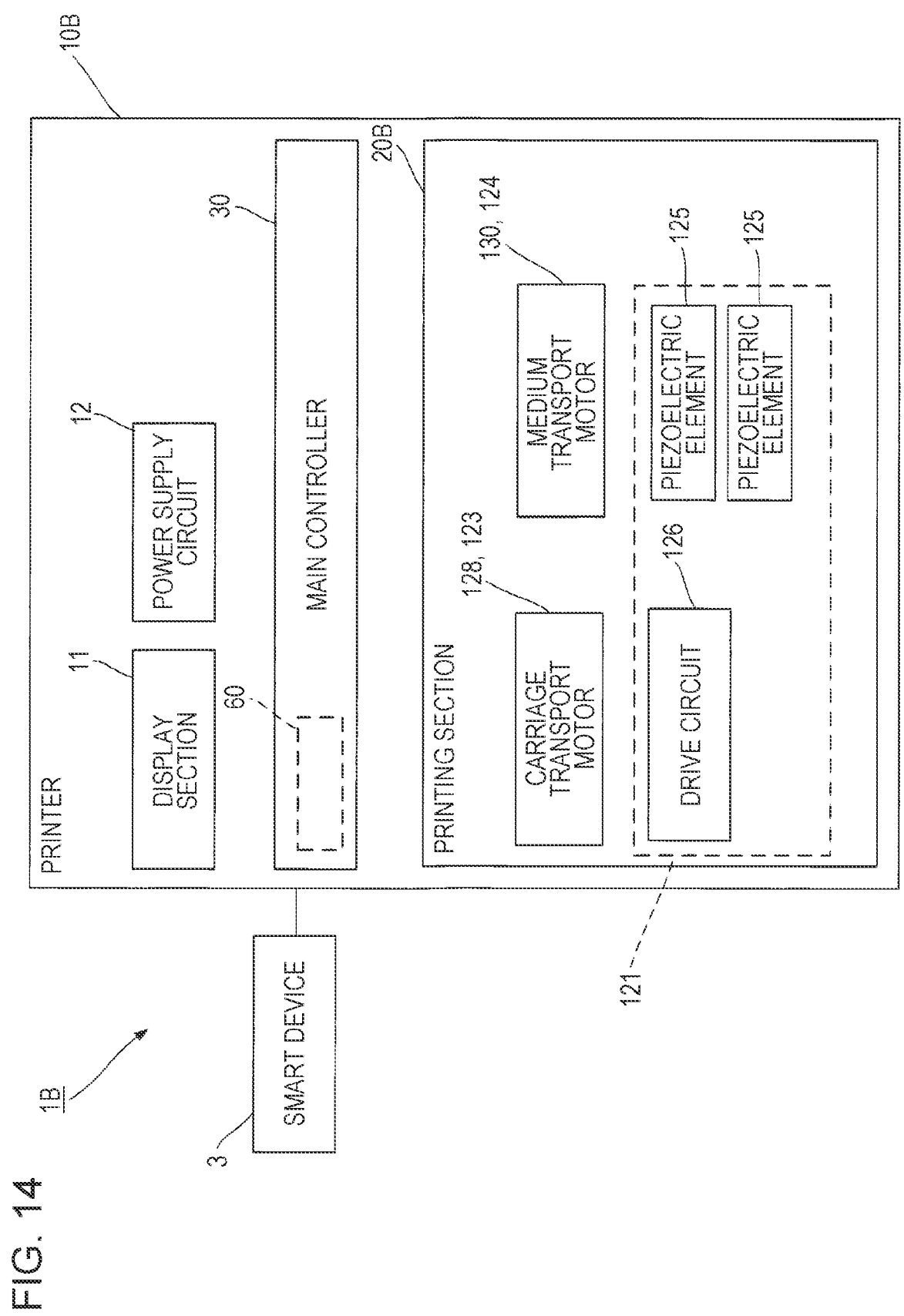
FIG. 14 is a block diagram illustrating the printer system.

Next, a printer 10B according to a second embodiment will be described with reference to FIGS. 12 to 14. FIG. 12 is a schematic view illustrating a printer system 1B including the printer 10B according to the second embodiment. FIG. 13 is a perspective view illustrating a printing section 20B of the printer 10B. FIG. 14 is a block diagram illustrating the printer system 1B. The printer 10B according to the second embodiment is different from the printer 10 of the first embodiment in that the printing section 20B having a piezoelectric element is provided instead of the printing section 20 having the heat generating element 25. In the description of the second embodiment, the same description as that of the first embodiment will be omitted.

The printer 10B illustrated in FIGS. 12 and 13 can be used as, for example, a home printer. The printer 10B is not limited to home use, and may be used for other purposes such as business use. The printer system 1B includes the printer 10B and an external device coupled to the printer 10B. The printer 10B includes a USB-Type-C interface 60 that is coupled to the external device. Examples of the external device include a smart device 3, a smartphone 6, a game terminal 7, an audio output device 8, a personal computer 9, a charger 14, and the like. The external device is not limited to these, and other electronic devices and the like may be used.

The printer 10B is a serial type ink jet printer. The printing section 20B of the printer 10B includes a carriage 122 on which the liquid ejecting head 121 is mounted, a carriage transport mechanism 123, and a medium transport mechanism 124.

The liquid ejecting head 121 includes a nozzle for ejecting ink and a pressure chamber communicating with the nozzle. As illustrated in FIG. 14, the liquid ejecting head 121 includes a plurality of piezoelectric elements 125 generating a pressure in the ink of the pressure chamber, and a drive circuit 126 for driving the piezoelectric element 125. The piezoelectric element is an example of a printing element. The power is supplied from the power supply circuit 12 to the piezoelectric element 125 and the drive circuit 126. Further, the carriage 122 is mounted with an ink cartridge for storing the ink ejected from the liquid ejecting head 121.

The carriage transport mechanism 123 includes a transport belt 127 for transporting the carriage 122 and a carriage transport motor 128 for driving the transport belt 127. The power is supplied from the power supply circuit 12 to the carriage transport motor 128. The medium transport mechanism 124 includes a transport roller 129 transporting the medium PA and a medium transport motor 130 driving the transport roller 129. The power is supplied from the power supply circuit 12 to the medium transport motor 130.

The printer 10B according to the second embodiment also has the same effect as the printer 10 according to the first embodiment. The printer 10B can change the maximum power that can be supplied to the external device according to a drive rate of the plurality of piezoelectric elements 125 when printing is performed by the printing section 20B. The CC terminal 63 can detect that the printer 10B is coupled to the external device that can be supplied with the power via the $V_{BUS}$ terminal 61. In a state in which the external device is coupled to the printer 10B, when the printing section 20B performs printing, the amount of power supplied to the external device can be large in a case in which the drive rate of the plurality of piezoelectric elements 125 is low as compared with a case in which the drive rate of the plurality of piezoelectric elements 125 is high.

In a state in which the external device is coupled to the printer 10B, when the printing section 20B performs printing, in a case in which the drive rate of the plurality of piezoelectric elements 125 is high, the amount of power supplied to the external device can be smaller than in a case in which the drive rate of the plurality of piezoelectric elements 125 is low. As a result, the printing section 20B can perform printing while supplying power to the external device. The printer 10B can avoid a shortage of power in the printing section 20B.

The above-described embodiments are merely representative forms of the present disclosure. The present disclosure is not limited to the above-described embodiments, and various modifications and additions can be made in so far as they do not depart from the spirit of the present disclosure.

In the above-described embodiment, a part of the processing executed by the CPU 31 may be executed by another control section such as the USB control section 53. Similarly, a part of the processing executed by the USB control section 53 may be executed by the CPU 31.

The printer 10 includes a printing element which is a heat generating element in the above-described embodiments, but the printer 10 is not limited to one including the heat generating element, and may be a printer including other printing elements. The printing apparatus may be an ink jet printer including a piezoelectric element as a printing element and ejecting ink onto a medium. The printing apparatus may be a dot impact printer or another printer such as a laser printer.

The POS system 1 including the printer 10 has been described in the above-described embodiments, but the use of the printer 10 is not limited to the POS system 1. The printing apparatus of the present disclosure may be a home printing apparatus, a business printing apparatus, or a printing apparatus used for other purposes.

The external device coupled to the printing apparatus is not limited to the smart device 3, the customer display 4, the handy scanner 5, and the charger 14, and may be other external devices. The external device may be, for example, another external device such as an audio output device, an image display device, a game terminal, or a smartwatch.

What is claimed is:

1. A printing apparatus comprising:
a printing section including a plurality of printing elements that performs printing on a medium;
a power supply circuit supplying power to the printing section;
a control circuit controlling the printing section and the power supply circuit; and
a USB-Type-C interface configured to couple an external device and including a data transmission/reception terminal, a power input/output terminal, and a state identification terminal, wherein
the data transmission/reception terminal receives a data signal from the external device, and transmits the data signal to the external device,
the power input/output terminal receives the power supplied from the external device, and supplies the power from the power supply circuit to the external device,
the state identification terminal identifies a state in which the data transmission/reception terminal receives the data signal or a state in which the data transmission/reception terminal transmits the data signal, and identifies a state in which the power input/output terminal receives the power supplied from the external device or a state in which the power input/output terminal supplies the power to the external device, and
when the state identification terminal detects that the external device that receives the power via the power input/output terminal is coupled, and the printing section performs printing, an amount of power supplied to the external device is large in a case in which a drive rate of the plurality of printing elements is low as compared with a case in which the drive rate of the plurality of printing elements is high.

2. The printing apparatus according to claim 1, wherein the control circuit gradually decreases the amount of power supplied to the external device according to an increase in the drive rate of the plurality of printing elements.

3. The printing apparatus according to claim 1, wherein the control circuit does not supply the power to the external device when the drive rate of the plurality of printing elements is 100%.

4. The printing apparatus according to claim 1, wherein the control circuit supplies a maximum amount of power to the external device when the printing section does not perform printing.

5. The printing apparatus according to claim 1, wherein the printing section executes high-speed printing and low-speed printing, and
the control circuit reduces the amount of power supplied to the external device in the high-speed printing than that in the low-speed printing.

6. The printing apparatus according to claim 1,
a plurality of power supply modes having different amounts of power supplied to the external device are provided, and
the control circuit switches the power supply mode and reduces the amount of power supplied to the external device, before executing a print command in the printing section.

7. The printing apparatus according to claim 6, wherein the control circuit performs switching to the power supply mode in which the amount of power supplied to the external device is maximum, after the printing section completes the printing.

* * * * *